US010760732B1

(12) United States Patent
Koh et al.

(10) Patent No.: US 10,760,732 B1
(45) Date of Patent: Sep. 1, 2020

(54) LOCKING SYSTEM WITH A QUICK-RELEASE MECHANISM

(71) Applicants: Vincent Jun Yong Koh, Singapore (SG); Nicholas Chuo Ming Koh, Singapore (SG)

(72) Inventors: Vincent Jun Yong Koh, Singapore (SG); Nicholas Chuo Ming Koh, Singapore (SG)

(*) Notice: Subject to any disclaimer, the term of this patent is extended or adjusted under 35 U.S.C. 154(b) by 0 days.

(21) Appl. No.: 16/398,510

(22) Filed: Apr. 30, 2019

(51) Int. Cl.
F16M 13/02 (2006.01)
H04B 1/3877 (2015.01)
F16M 11/08 (2006.01)
F16M 11/04 (2006.01)

(52) U.S. Cl.
CPC ........ *F16M 13/022* (2013.01); *F16M 11/041* (2013.01); *F16M 11/08* (2013.01); *F16M 13/02* (2013.01); *H04B 1/3877* (2013.01)

(58) Field of Classification Search
CPC .... H04B 1/3877; F16M 13/02; F16M 13/022; F16M 11/041; F16M 11/08
See application file for complete search history.

(56) References Cited

U.S. PATENT DOCUMENTS

| | | | | |
|---|---|---|---|---|
| D433,616 S | * | 11/2000 | Fischer | D8/355 |
| 8,267,418 B1 | * | 9/2012 | Chuang | B62J 99/00 280/279 |
| 9,243,739 B2 | * | 1/2016 | Peters | F16M 13/00 |
| 10,419,054 B1 | * | 9/2019 | VanTassell | H04B 1/3877 |
| 10,623,042 B1 | * | 4/2020 | Riedl | H04B 1/3877 |
| 2008/0283704 A1 | * | 11/2008 | Hsu | B62J 11/00 248/230.5 |
| 2014/0360893 A1 | * | 12/2014 | Whitten | F16M 11/242 206/45.2 |
| 2016/0212869 A1 | * | 7/2016 | Gutschenritter | A42B 3/04 |
| 2017/0113814 A1 | * | 4/2017 | Zhao | F16M 11/08 |
| 2017/0174362 A1 | * | 6/2017 | Zhao | G03B 15/006 |
| 2018/0375979 A1 | * | 12/2018 | Krenn | F16M 11/041 |
| 2019/0154190 A1 | * | 5/2019 | Yun | B60R 11/0252 |

FOREIGN PATENT DOCUMENTS

DE  202013105828 U1 * 1/2014 ........... H04B 1/3877

* cited by examiner

*Primary Examiner* — Eret C McNichols
(74) *Attorney, Agent, or Firm* — WPAT, PC

(57) ABSTRACT

A locking system with a quick-release mechanism for mounting an article or the like is disclosed. The locking system may generally comprise (a) a mounting plate, (b) a main shaft, (c) clutch, (d) a locking member, and (e) a covering cap. The mounting plate is provided with a central cavity at the centre thereof. The circumferential edge of the central cavity is formed into conical surface and a plurality of locking grooves. The mounting plate can be fastened onto any gadget that is to be mounted onto a support. A case for handphone is to be mounted on to a support by using the locking system of the present invention. The mounting plate is fastened onto the handphone case at the rear surface of a phone by inserting the mounting plate to a prefabricated hole at the back of the handphone case.

11 Claims, 15 Drawing Sheets

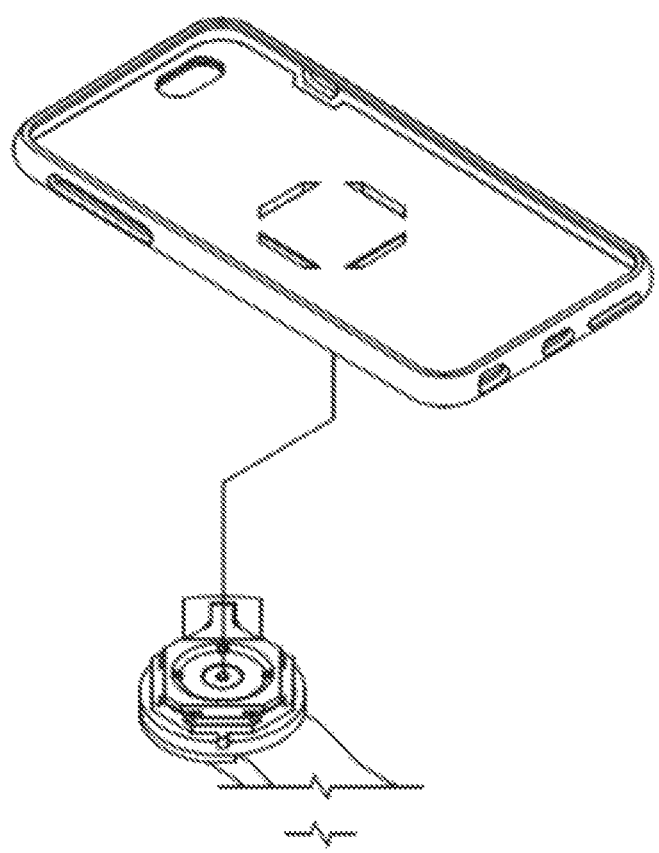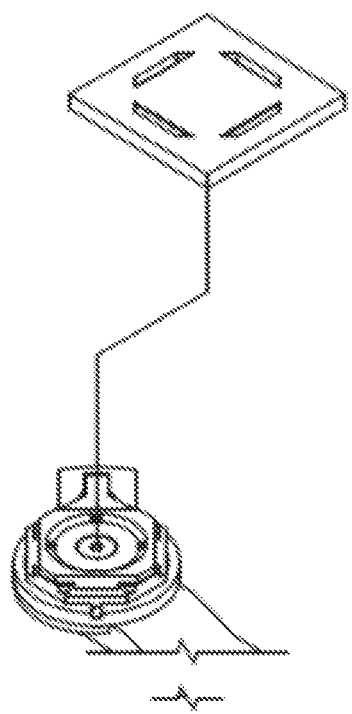
FIG. 16A
(PRIOR ART)
FIG. 16B
(PRIOR ART)

LOCKING SYSTEM WITH A QUICK-RELEASE MECHANISM

FIELD OF THE INVENTION

The present invention relates generally to locking system, and more particular to a locking system which holds and locks an object and can quickly release the object.

BACKGROUND OF THE INVENTION

In the market, a great number of devices used to hold handheld objects have been developed, and these handheld electronic devices/gadgets, such as navigation devices, lighting system for bicycles, smartphones, etc. Different types of casings are sold as a supplementary component to enclose the device so as to protect the edges of the gadget and as a locking part. In general, the rear surface of a handheld electronic device is provided with an attachment device for holding. Some cases are made of rigid plastic and are used to snap the device onto a locking system. Other cases are made of a flexible material that can be manipulated to attach to protect the electronic gadgets.

There are other mechanisms currently used to lock a gadget in place. A common mechanism for locking the gadget in place includes the use of a key which is attached to the chuck during the insertion or removal of an attachment. Disadvantages in these keyed chucks include the fact that the keys are easily lost or misplaced, and that they are often cumbersome to use.

Due to the number of handheld electronic devices has increased, and other gadgets to be held has increased, consumers are always looking for new locking system which can lock the device or the like and can easily be released as well.

U.S. Pat. No. 6,488,451 discloses a rotary power tool comprising: a drive motor; a shaft rotatively coupled to the drive motor; a locking structure secured to the shaft and including at least one engageable surface thereon; a directional control mechanism coupled to the drive motor; and a retractable interlocking mechanism coupled to the directional control mechanism and including a locking element, movable in response to movement of the directional control mechanism between a locking position in engagement with the engageable surface on the locking structure for preventing the rotation of the shaft and a retracted position out of engagement with the engageable surface to permit rotation of the shaft.

US Patent Publication No. 20040250577 discloses an electrical steering lock device comprising: a lock shaft operative to protrude into and retract from a lock groove, formed on a steering shaft, such that the lock shaft assumes a protruding position to engage with the lock groove for blocking rotation of the steering shaft while assuming a retracting position to disengage from the lock groove for unlocking rotation of the steering shaft; and a drive unit for protruding and retracting the lock shaft, wherein a retracting force, with which the lock shaft is retracted from the lock groove by the drive unit, is set such that the retracting force, occurring when the lock shaft is moved inside the lock groove, is set to be greater than that occurring when the lock shaft is moved outside the lock groove.

U.S. Pat. No. 9,139,246, entitled "Universal Mounting Device For One Or More Accessories And Method Of Using Same" discloses a device for removably mounting an accessory to a vehicle, the device comprising: a chassis including a first end, an opposing second end, at least one leg extending therebetween, and an accessory interface located proximate the first end of the chassis, the accessory interface including a first surface and an opposing second surface, the leg including at least one hole extending therethrough; at least one fastening mechanism extending into at least a portion of the hole of the leg; a first accessory mount and a second accessory mount, each accessory mount being configured to engage at least one of the first and second surfaces of the accessory interface; and at least one fastener extending through the first accessory mount, through the accessory.

U.S. Pat. No. 9,243,738, entitled "System And Method For Mounting A Handheld Electronic Device", discloses a system for mounting an electronic handheld device includes a case having a mounting structure and a locking structure attached to the case by aligning a portion of the locking structure with a portion of the mounting structure and rotating the locking structure or the case.

Conventional locking system such as Quadlock (disclosed in U.S. Pat. No. 9,243,738), Tiagra Sport, and Rokform, having mounting hole to be mounted onto a corresponding plate faces difficulties in alignment as the alignment is essentially depending on projections projected out from a circular body and grooves that allow the projections to enter. Further, these conventional locking systems have a release lock button which can cause undesired obstacle when the mounted device is blocking the user in viewing the location of the lock button. The mount system has a case/adaptor with an octagonal mounting hole which is used to attach to any handheld gadget or the like.

FIGS. 16A & 16B Indicate the possibilities of using currently available phone mount to mount phone onto a support. When a phone user wants to mount a phone using a mounting system, a mounting adapter for phone is required. FIG. 16A shows a phone case that can be mounted onto the locking system, while FIG. 16B shows a mounting adaptor plate which can be attached to any kind of electronic device and also be mounted onto the locking system.

The shortcomings of currently available octagonal mounting is that the matching and alignment are very much depend on the projections projected out from a circular body and grooves that allows the projection to enter.

BRIEF DESCRIPTION OF THE DRAWINGS

FIGS. 16A & 16B show prior art, indicating the possibilities of using currently available conventional phone mount to mount phone onto a support (prior art).

SUMMARY OF THE INVENTION

Figure 1A:
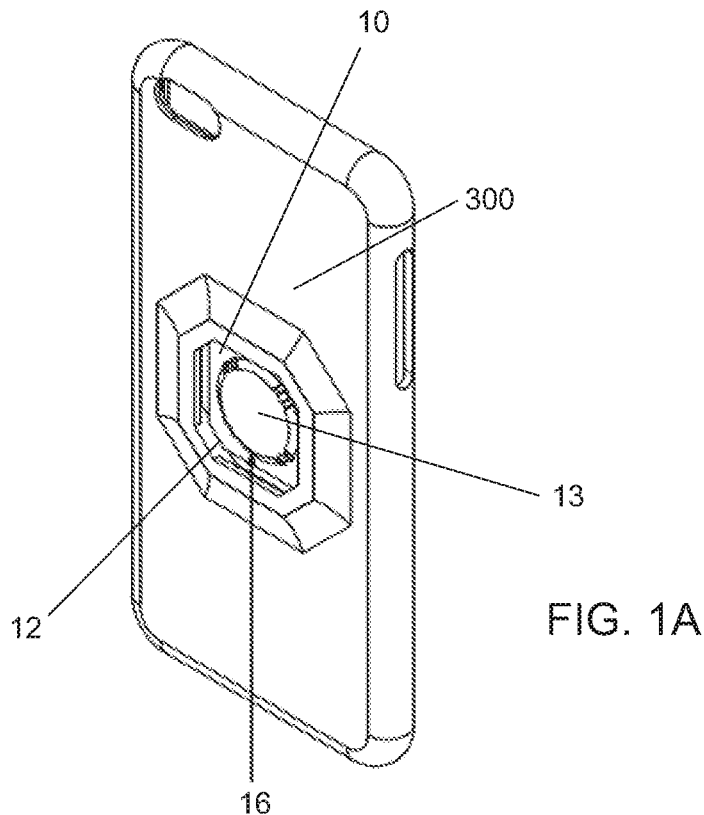
FIG. 1A is a perspective view of the mounting plate 10 of the preferred embodiment being mounted onto a phone casing 300 in accordance with the present invention.

The locking system with a quick-release mechanism has a case or adaptor with an octagonal mounting hole which can be attached to any instrument or gadget. In using the locking system, the octagonal mounting hole of the case or adaptor is placed over the octagonal plate on the main shaft of the locking system. The case or adaptor is rotated to a 45 degree angle, the case/adaptor engages 4 numbers of "teethes" on the clutch and follows the rotation of the case/adaptor. The rotating clutch will engage the sliding grooves on the lock pin.

The pins on the "lock Pin" will disengage from the shallow hole (neutral point) on the main shaft and follow the rotation of the case/adaptor. As it reaches the end of the 45 degree turn, the pins on the Lock Pin will disengage into the locking hole on the main shaft; at the same time, the corners of the octagonal plate will engage under the locking walls of the octagonal mounting hole. This action allows the system to lock the case and octagonal plate on the main shaft into position. The active sliding movement of the Lock Pin are controlled by the spring actions of the clamping member and a spring placed within the Lock Pin and clutch.

The present invention is to provide a locking system with a quick release mechanism comprising a mounting plate 10, a main shaft 20, a clutch 30, a locking member 40, and a covering cap 50.

Yet another object of the present invention is to provide a locking system with quick release mechanism, wherein the locking system has a dynamic release lock button which rotates with the gadget that is mounted, therefore, the system enables the user to quickly locate the release lock button.

A further object of the present invention is to provide a locking system with a quick release mechanism, as a result of the quick release dynamic lock the users can operate the system with one hand regardless of the location of the release lock button.

Yet still another object of the present invention is to provide a locking system with a quick-release mechanism, wherein the dynamic lock allows the user to set the release lock button to their desired position without reinstalling the system.

Further object of the present invention is to provide a locking system with a quick-release mechanism, wherein the structure is compact which eliminates the space constrain users encounter during installation.

Yet another further object of the present invention is to provide a locking system with a quick-release mechanism, wherein the system requires little components/parts, which is easy to install, maintain and replace parts.

Still yet another object of the present invention is to provide a locking system with a quick-release mechanism, the system comprises (a) a mounting plate 10 adapted for attachment to the article or the like, wherein the mounting plate 10 includes a central cavity 13 having a plurality of locking grooves 14 and conical surface 16 along the circumferential edge of the central cavity 13;

(b) a main shaft 20 having one surface with a shape adapted for mounting onto the mounting plate 10 and having a plurality of locking projections 27 formed circumferentially on a circular groove 28 provided on the surface of the main shaft 20, and one the other surface of the main shaft 20 being formed into a plurality of disengagement position hole 23, a plurality of sliding projections 24, and primary pin engagement hole 21 and a circular wall surface 22 for the contact movement with the circular wall surface 32 of a clutch 30 surface of the edge of pin is circular and clutch.

(c) the clutch 30 having a narrow tip 38 protruded outwardly, and a circular cavity 31 with a protruded circular wall 32 with two oppositely arranged clamping elements 33, wherein a groove 34 is formed between the two clamping elements 33 on the circular wall 32, and a sliding projection 35 is formed at a notch 36 formed on the circular wall 32, and wherein a sliding surface 37 is formed at the narrow tip 38 of the clutch 30 being extended outwardly, wherein at least two clamping grooves are formed between the at least two clamping elements 33;

(d) a locking member 40 having a generally circular cavity 41 with a sliding groove 42 for the engagement with the sliding projection 24 of the main shaft 20, and a primary pin 42 and a secondary pin 43 formed along the circumferential edge of the cavity 41, and two hooks 44 extending outwardly from the circumferential edge of the cavity 41, having a sliding slot 45 and a squeezing releasing surface 48; and (e) a covering cap 50 having a generally circular structure having a plurality rounded circular ridges with a series of indention for said secondary pin 43, wherein the center of the covering cap 50 is for fastening the main shaft 20, the clutch 30 the locking member 40 and the coving cap 50 as a combined unit, wherein the mounting plate 10 is attached to the object or the gadget, and the main shaft 20 is then locked onto the mounting plate 10, the clutch 30 is coupled to the mounting plate 10, the main shaft 20 is mounted with the covering cap 50 and the main shaft 20 is twisted to lock the object to the mounting plate 10 by rotating the object or the like to an angle of 45, the object is released from being mounted.

A further object of the present invention is to provide a locking system with a quick release mechanism, wherein the hooks 44 of the locking member 40 enter and stay in the clamping groove 39 on the clutch 30.

In general, the principles of the present invention provide for a fixed, mountable member that couples to an article such as computer components, handheld gadgets, mugs or the like. The locking system with a quick-release mechanism of the present invention comprises (a) a mounting plate 10 adapted for attachment to the article or the like, wherein the mounting plate includes a central cavity 13 having a plurality of locking grooves 14 and conical surface 16 along the circumferential edge of the central cavity 13;

(b) a main shaft 20 having one surface with a shape adapted for mounting onto the mounting plate 10 and having a plurality of locking projections 27 formed circumferentially on a circular groove 28 on the surface of the main shaft 20, and one the other surface of the main shaft being formed into a plurality of disengagement position hole 23, a sliding projections 24, and primary pin engagement hole 21 and a circular wall surface 22 for the contact, the movement with the circular wall surface 32 of clutch 30 a surface of the edge of pin is circular and clutch.

(c) the clutch 30 having a narrow tip 38 and a circular cavity 31 with the protruded circular wall 32 with two oppositely arranged clamping elements 33, wherein a groove 34 is formed between the two clamping elements 33 on the circular wall 32, and a sliding projection 35 is formed at a notch 36 formed on the circular wall 32, and wherein a sliding surface 37 is formed at the narrow tip 38 of the clutch 30 being extended outwardly, wherein at least two clamping grooves are formed between the at least two clamping elements 33;

(d) a locking member 40 having a generally circular cavity 41 with a sliding groove for the engagement with the sliding projection 24 of the main shaft 20, and a primary pin 42 and a secondary pin 43 formed along the circumferential edge of the cavity 41, and a protrusion 44 extending outwardly from the circumferential edge of the cavity 41, having a sliding slot 45 and a squeezing releasing surface 46; and (e) a covering cap 50 having a generally circular structure having a plurality rounded circular ridges with a series of indention for said secondary pin 43, wherein the center of the covering cap 50 is for an inlaid nut insert, wherein the mounting plate 10 is attached to the object or the gadget, and the main shaft 20 is then locked onto the mounting plate 10, the clutch 30 is coupled to the mounting plate 10, the main shaft 10 is mounted with the covering cap 50 and the main shaft 10 is twisted to lock the object to the mounting plate 10 by rotating the object or the like to an angle of 45, the object is released from being mounted.

The details of one or more embodiments of the invention are set forth in the accompanying drawings and the description below. Other features, objects, and advantages of the invention will be apparent from the description and drawings, and from the claims.

DETAILED DESCRIPTION OF THE PRESENT INVENTION

Figure 8:
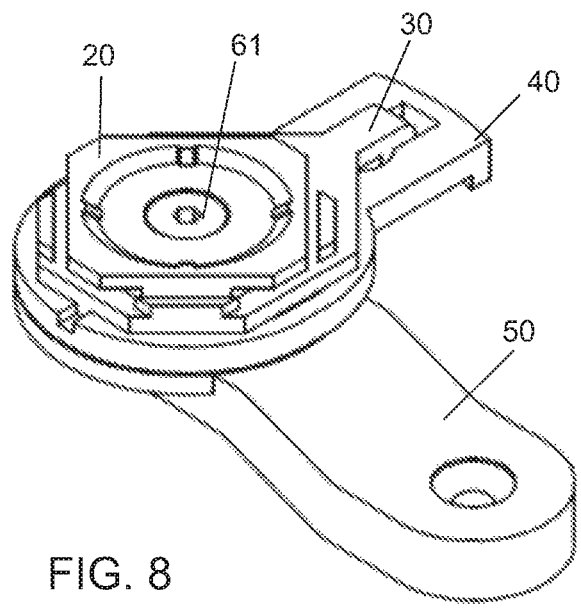
FIG. 8 is a perspective view of the locking system with a quick-release mechanism of a preferred embodiment in accordance with the present invention.

As discussed above, embodiments of the present disclosure relate to a locking system with a quick-release mechanism. Referring to the drawings, FIG. 8 is a perspective view depicting an embodiment of a locking system 100 with a quick-release mechanism. The locking system 100 may generally comprise (a) a mounting plate 10, (b) a main shaft 20, (c) clutch 30, (d) a locking member 40, and (e) a covering cap 50.

Figure 1B:
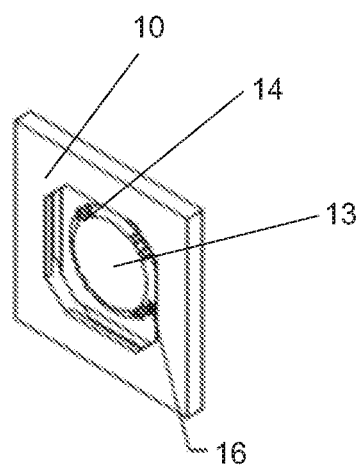
FIG. 1B is a perspective view of the mounting plate 10 of the preferred embodiment in accordance with the present invention.

Referring to FIGS. 1A and 1B, there is shown a perspective view of the mounting plate 10 in accordance with the present invention. The mounting plate 10 is provided with a central cavity 13 at the centre thereof. The circumferential edge of the central cavity 13 is formed into conical surface 16 and a plurality of locking grooves 14. The mounting plate 10 can be fastened onto any gadget that is to be mounted onto a support. In the preferred embodiment, a case for handphone 300 is to be mounted on to a support by using the locking system 100 of the present invention. The mounting plate 10 is fastened onto the handphone case 300 at the rear surface of a phone by inserting the mounting plate 10 to a prefabricated hole at the back of the handphone case 300, as shown in FIG. 1A.

Figure 2C:
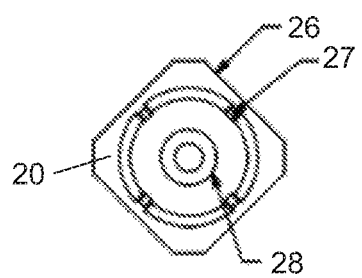
FIG. 2C is the top view of the main shaft of the preferred embodiment of the present invention.
Figure 2A:
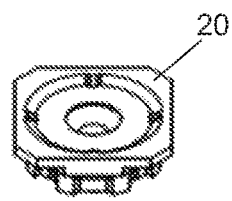
FIG. 2A is a perspective view of the main shaft 20 of the preferred embodiment in accordance with the present invention.
Figure 2B:
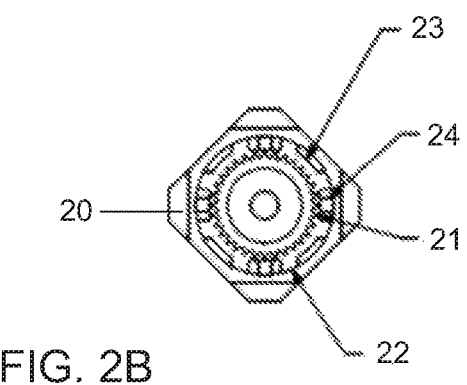
FIG. 2B is the bottom view of the main shaft of the preferred embodiment of the present invention.

As shown in FIGS. 2A & 2B, there is shown the main shaft 20 of the locking system 100 of the present invention. In the center of the main shaft 20, a hole for a countersunk screw is provided. On the opposite side for which the countersunk screw hole 28 is located, there is provided with a circular wall surface 22, a primary pin engaging hole 21, a sliding projection 24 and a disengagement position hole 23. In the present preferred embodiment, the main shaft 20 has an octagonal plate 26 with a plurality of locking projections 27. FIG. 2B is the bottom view of the main shaft 20 of the preferred embodiment of the present invention. FIG. 2C is the top view of the main shaft 20 of the preferred embodiment of the present invention.

Figure 3B:
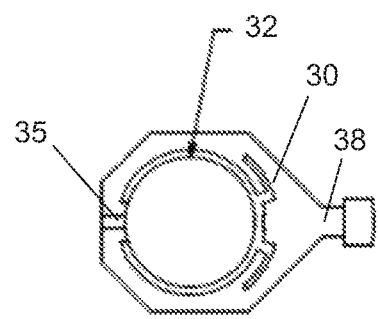
FIG. 3B is the top view of the clutch 30 of the preferred embodiment of the present invention.
Figure 3A:
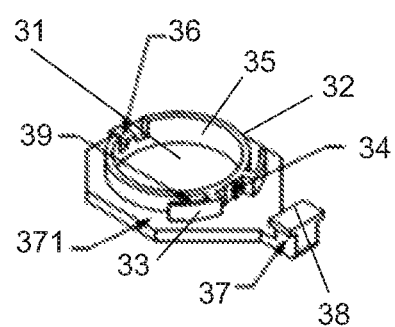
FIG. 3A is a perspective view of the clutch 30 of the preferred embodiment in accordance with the present invention.
Figure 3C:
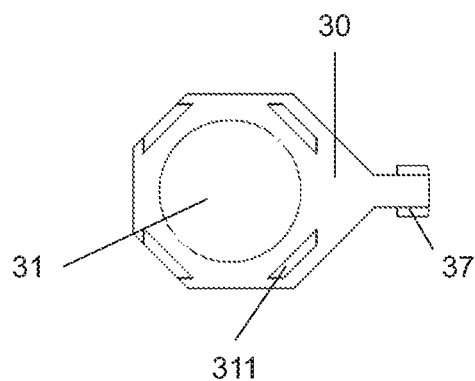
FIG. 3C is the bottom view of the clutch 30 of the preferred embodiment of the present invention.

FIG. 3A is a perspective view of a clutch 30 in accordance with the present invention. The clutch 30 is substantially a plate-like structure having a central hole 31, and on one side of clutch 30, there are two circular wall surfaces 35, 32. The circular wall surface 35 is adapted for the main shaft's circular surface 22, and the circular surface 32 is adapted for the pair of hooks 44. The circular wall is also provided with a pair of clamping element 33 enclosing a clamping groove 39 between the clamping element 33 and the circular wall 32. A spring hole 341 is provided on the inner side of the wall of the locking member 40. A structure is extended outward from one side of the clutch 30 and the tip of the extended structure is sliding surface 37 which is used to engage with the locking member in place. FIG. 3B is the top view of the clutch 30 of the preferred embodiment of the present invention. FIG. 3C is the bottom view of the clutch 30 of the preferred embodiment of the present invention.

Figure 4:
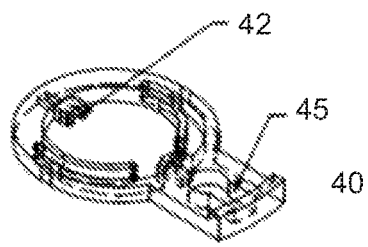
FIG. 4 is a perspective view of the locking member 40 of the preferred embodiment in accordance with the present invention.

FIG. 4 is a perspective view of the locking member 40 in accordance with the present invention. Similarly, the locking member 40 is substantially a plate-like structure, wherein an extension is protruded outward to form a sliding slot 45 and a squeeze release surface 48. The center of the locking member 40 is a cavity 41, wherein a pair of hooks 44 are protruded to the cavity 41. The hooks 44 enter and stay in the clamping groove 39 of the clutch 30. Adjacent to the slot 45 on the locking member 40, there is provided a secondary pin 43, corresponding to the primary pin 49 on the other side of the cavity 41. There is a sliding groove 42 located just next to the primary pin 49.

Figure 5:
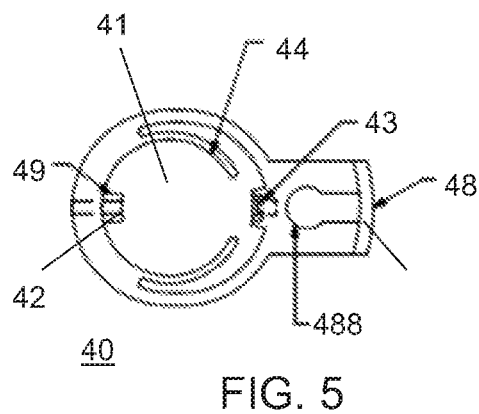
FIG. 5. Is the top view of the locking member 40 of the preferred embodiment in accordance with the present invention.

FIG. 5 is a top view of the locking member 40, in accordance with the present invention. The primary pin 49 is located directly opposite of the secondary pin 43 along the circumferential edge of the cavity 41 of the locking member 40. A circular hole 488 on the locking member 40 is being made for use in installation the locking member 40 to the clutch 30.

Figure 6B:
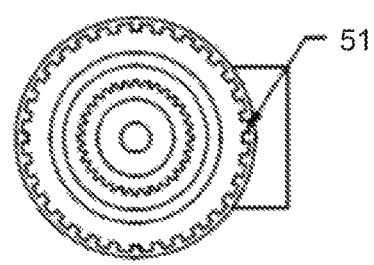
FIG. 6B is a top view of the covering cap 50 of the preferred embodiment in accordance with the present invention.
Figure 6A:
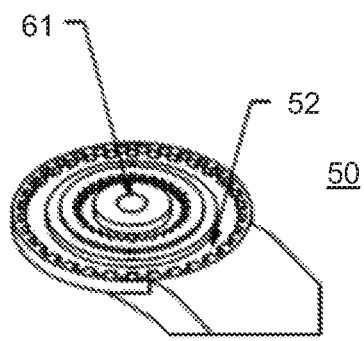
FIG. 6A is a perspective view of the covering cap 50 of the preferred embodiment in accordance with the present invention.

FIG. 6A is a perspective view of the covering cap 50 in accordance with the present invention. The secondary engagement holes 51 are located close to the edge of the covering cap 50. The indentation 52 between each two engagement holes 51 is used to move the secondary pin 43 on the locking member 40. A screw 61 and an inlaid nut 62 are to be used to fasten through the center of the covering up cap 50. FIG. 6B is a top view of the covering cap 50 of the preferred embodiment in accordance with the present invention.

Figure 7I:
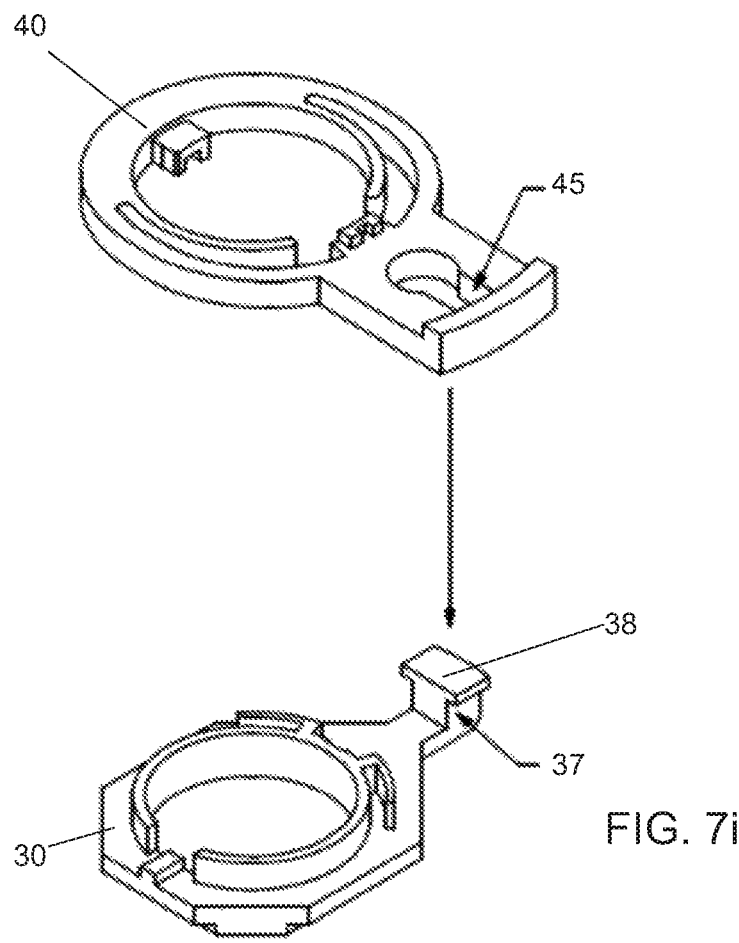
FIG. 7i to FIG. 7r illustrate the combination of each components of the locking system with a quick-release mechanism in accordance with the preferred embodiment of the present invention.
Figure 7J:
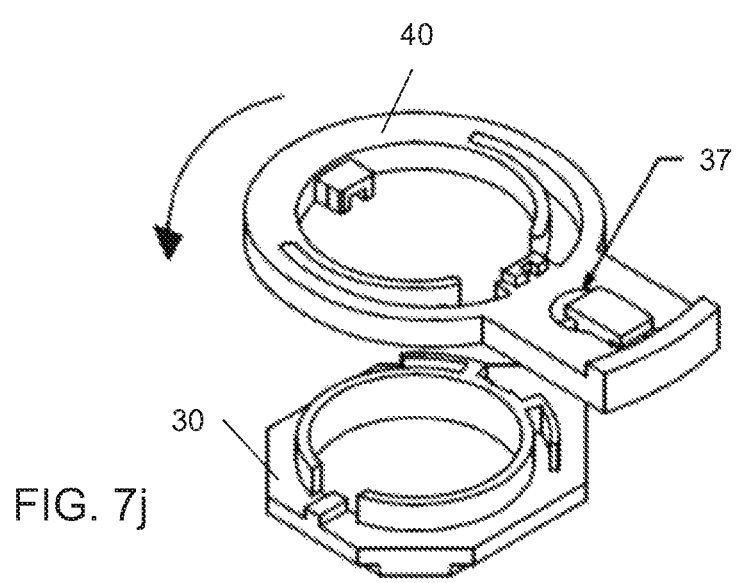
Figure 7K:
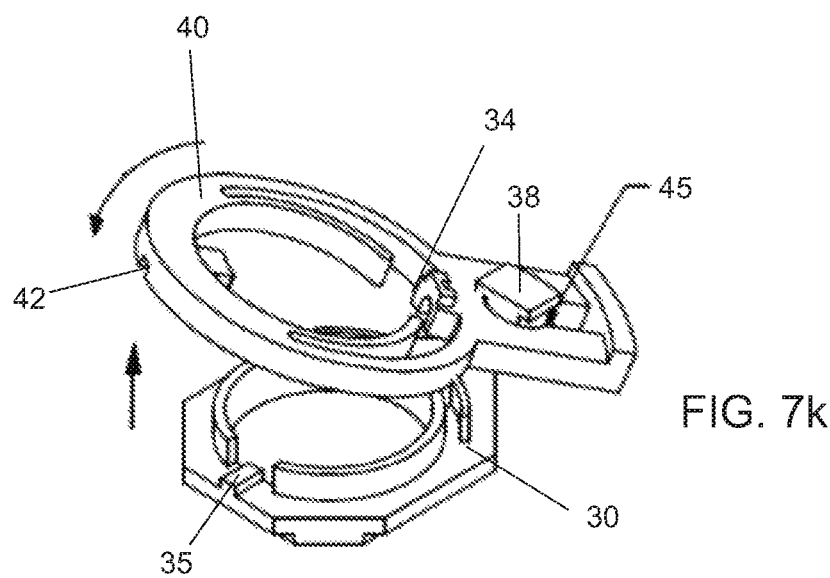
Figure 7L:
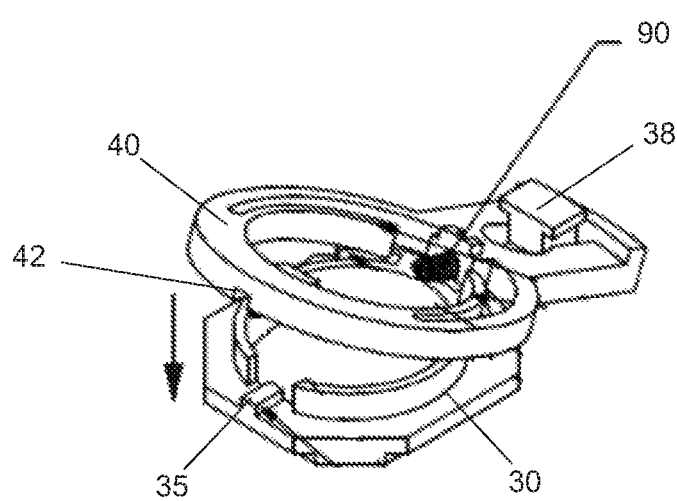
Figure 7M:
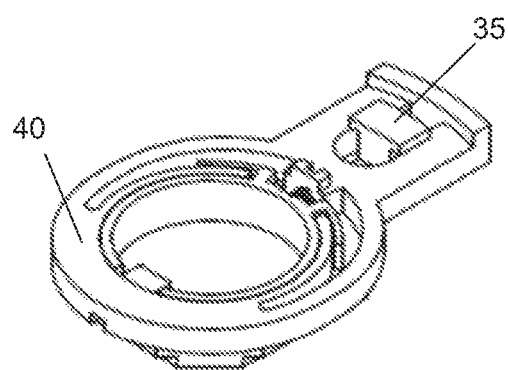
Figure 7N:
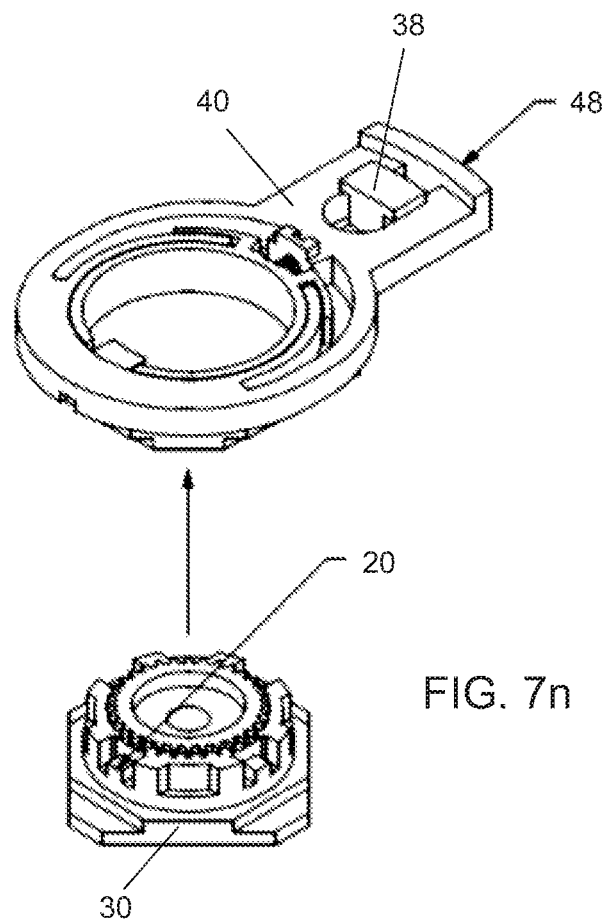

Referring to FIGS. 7i-7r, there are drawings which show the combination of each components 20, 30, 40, 50 of the locking system 100 with a quick-release mechanism in accordance with the preferred embodiment of the present invention. As shown in FIG. 7i, the clutch 30 is first to combine with the locking member 40. In doing so, the sliding surface 38 of the clutch 30 is inserted into the sliding slot 45 of the locking pin 40. The clutch 30 has to turn to a certain angle with respect to the locking member 40 in order to allow the sliding surface 38 to be able to enter the sliding slot 45. After the sliding surface 38 is within the sliding slot 45, rotate the locking member 40 such that the locking member 40 seats onto the clutch 30 (as shown in FIGS. 7j-7m). As shown in FIG. 7k, when the locking member 40 is rotating, lift the locking member 40 upwards with respect to the sliding surface of the clutch 30 to allow the locking member 40 to continue the rotating movement until the locking member 40 and the clutch 30 are in parallel. When the locking member 40 and the clutch 30 are in parallel, a spring 90 is inserted into the horizontal groove 34 for the spring 90 to sit on the clutch 30. The horizontal groove 34 allows the spring 90 to sit into the position. At this instant, both the clamping element 33 on the clutch 30 are aligned with the clamping groove 39 to allow the clamping element 33 to enter. The sliding projection 35 on the clutch 30 is aligned with the sliding groove 42 on the locking member 40. While inserting the locking member 40 into the clutch 30, pushing the spring 90 backwards to allow the spring 90 to rest on the horizontal groove 34. FIG. 7m shows a completed combination of the clutch 30 with the locking member 40 in accordance with the present invention.

Figure 7O:
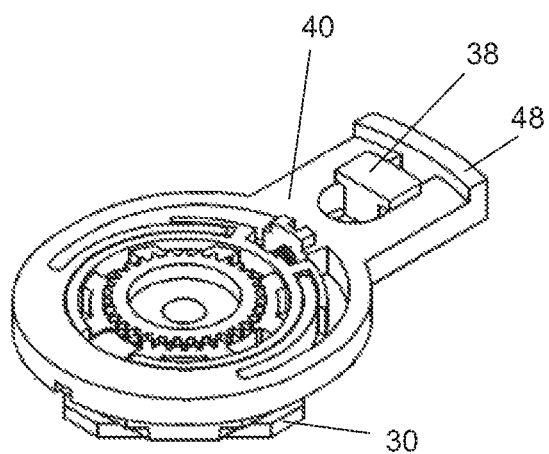

The next component to be mounted to the assembling of the locking member 40 and the clutch 30 is the main shaft 20. The primary pin 49 on the locking member 40 has to be in alignment with the engaging hole 21 on the main shaft 20. In doing so, some adjustments are required by sliding and/or squeezing the release surface 48 on the locking member 40 to allow the primary pin 49 to enter into the engaging hole 21 for the primary pin 49. FIG. 7o illustrates the structure that includes the locking member 40, the clutch 30, and the main shaft 20 in accordance with the present invention.

Figure 7P:
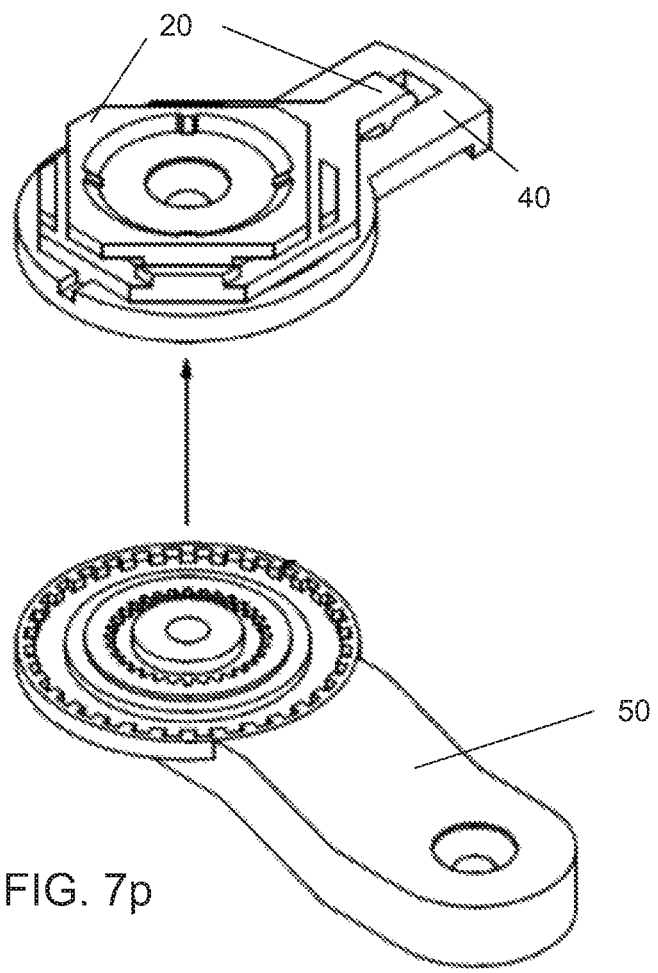
Figure 7Q:
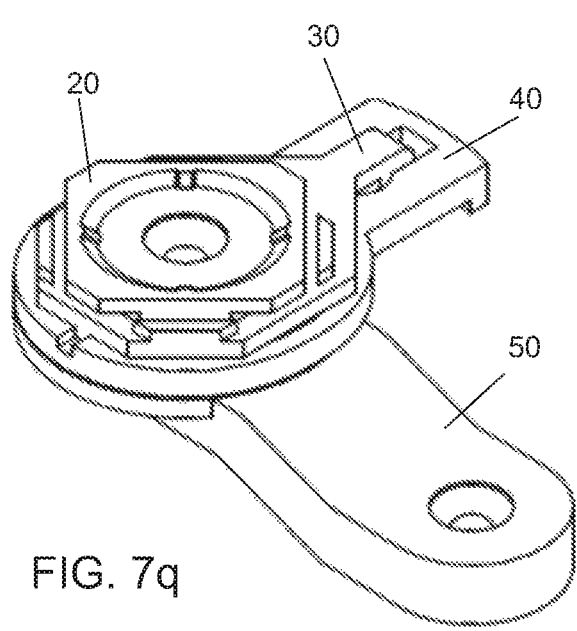
Figure 7R:
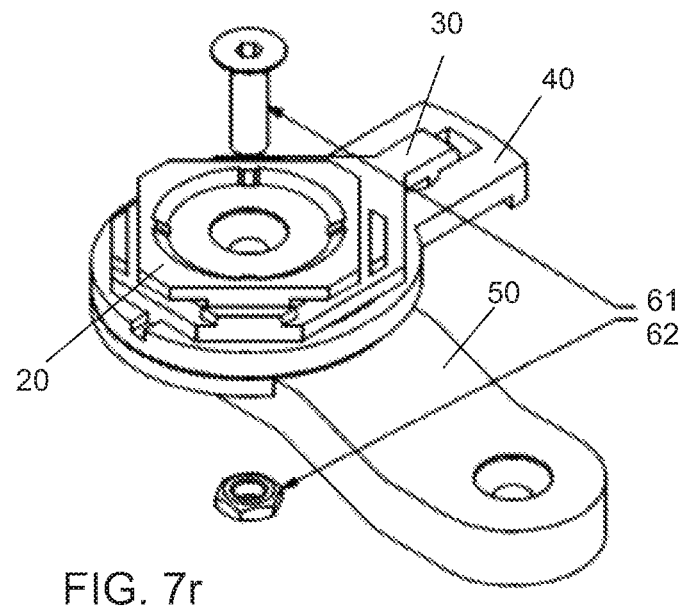

FIGS. 7p to 7r show the final step of completing the locking system 100 with a quick-release mechanism in accordance with the present invention. The covering cap 50 is to be mounted onto the combination includes the main shaft 20, the locking member 40 and the clutch 30. The covering cap 50 is inserted into the assembled structure of the locking member 40, the clutch 30 and the main shaft 20.

FIG. 7q is a perspective view of the assembled structure of the components, the covering cap 50, the locking member 40, the main shaft 20, and the clutch 30 of the preferred embodiment of the present invention.

FIG. 7r is a perspective view showing the fastening of all the respective components forming the locking system with a quick-release mechanism in accordance with the preferred embodiment of the present invention. In accordance with the preferred embodiment, a screw 61 and a nut 62 are used to tighten all the components to form as one unit.

FIG. 8 is a perspective view of the locking system with a quick-release mechanism in accordance with the preferred embodiment of the present invention.

Figure 9:
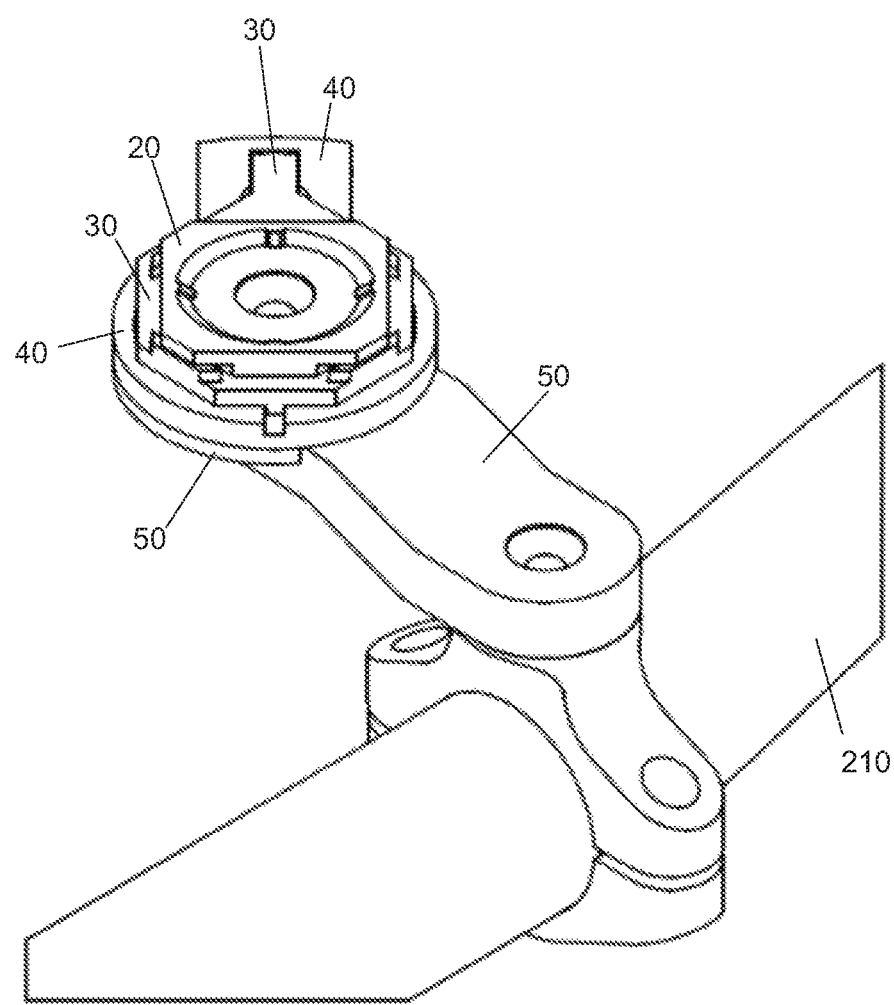
FIG. 9 is a perspective view showing the locking system being mounted onto a bicycle handle bar in accordance with the present invention.
Figure 10A:
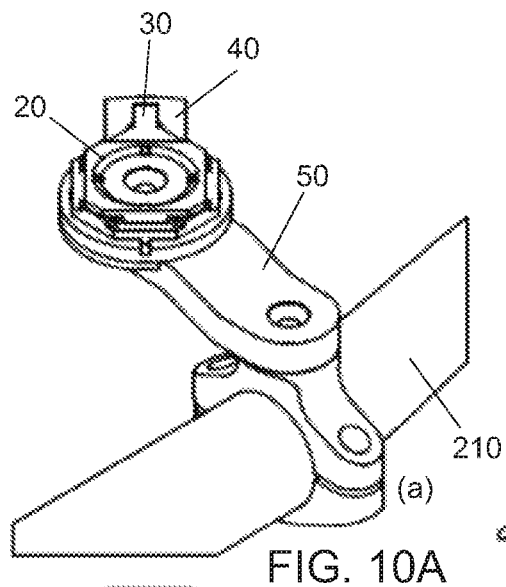
FIGS. 10A to 10D indicate the four disengagement positions in accordance with the present invention.
Figure 10B:
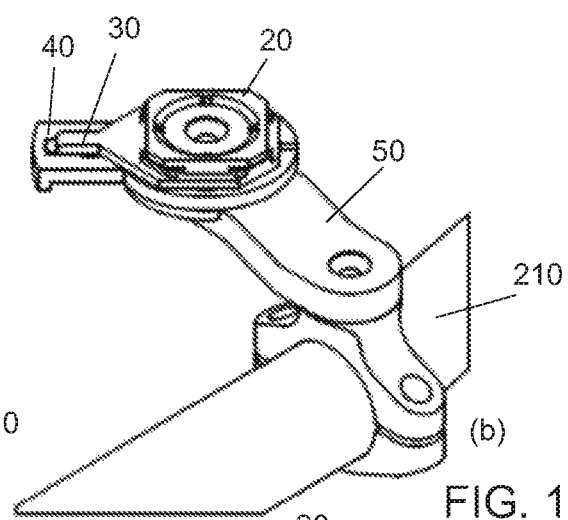
Figure 10C:
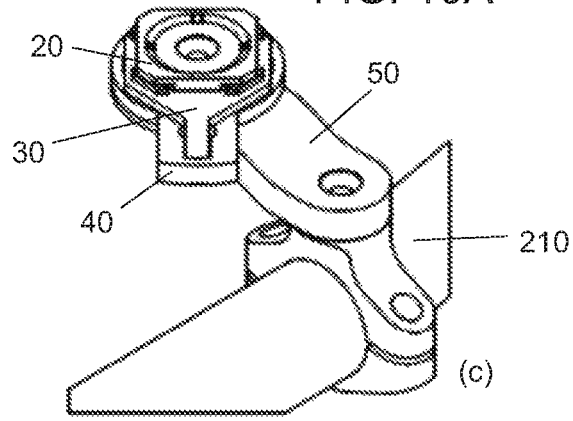
Figure 10D:
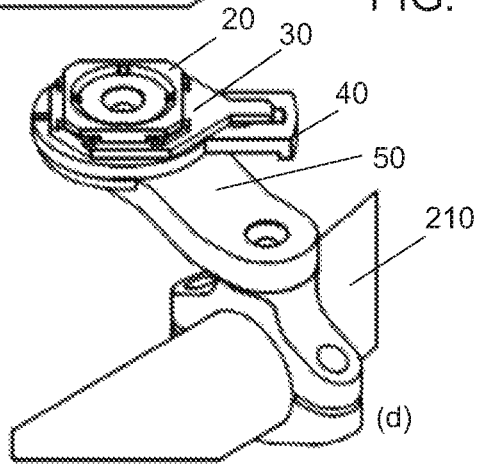

FIG. 9 is a perspective view showing the use of the locking system 100 in accordance with the present invention. First, the covering cap 50, which can be made into any kind of shapes or forms facilitating mounting procedure, is mounted for instance onto a wall, or the dashboard of a car, or a bicycle handle bar 210 or the like. Before the locking system 100 is used to be mounted onto a support, the clutch 30 and the locking member 40 are required to be set to the disengagement position of the component. In accordance with the preferred embodiment of the present invention, the locking system 100 has a total of four disengagement positions, which can be seen in FIGS. 10A-FIG. 10D. As shown, the disengagement positions are located at the longer side of the octagonal mounting plate 10, along the length of the mounting plate 10.

In the present preferred embodiment, as mentioned in the description, the locking system 100 comprises (a) a mounting plate 10 which is octagonal and has a central cavity 13, (b) a main shaft 20, (c) a clutch 30, (d) a locking member 40, and (e) a covering cap 50. The mounting plate 10 can be attached to any gadget or article that is to be secured. The octagonal mounting plate 10 is rotated to a 45 degree, and the mounting plate 10 engages with the teeth 311 on the clutch 30, and follows the rotation of the mounting plate 10. The rotating of the clutch 30 will engage with the sliding grooves 42 on the locking member 40. The pin 49 will disengage from the main shaft 20 and follow the rotation of the mounting plate 10. When at the end of the 45 degree turn, the pin 49 on the locking member 40 will engage with the locking hole on the main shaft 20, and at the same time, the corners of the mounting plate 10 will engage under the locking walls (not shown) of the mounting hole 12. This movement allows the locking system to lock the mounting plate 10 onto the main shaft 20.

In the preferred embodiment, the active sliding movement of the locking member 40 are controlled by the spring action of the clamping element 33, and the spring 90 positioned within the locking member 40 and the clutch 30.

Figure 12:
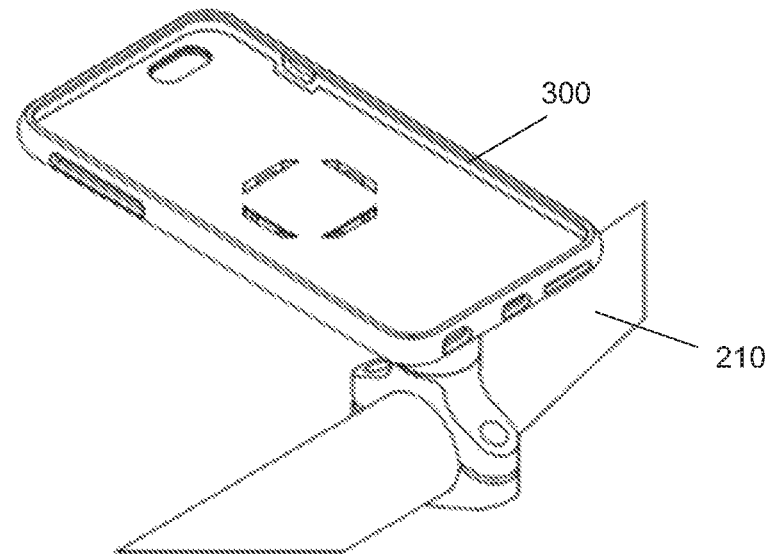
FIG. 12 is a perspective view showing the phone being mounted onto the locking system and being turned to a 90 degree in accordance with the present invention.

To mount the mounting gadget 300, for instance, a phone on a phone casing 300, the octagonal mounting hole 12 on the mounting gadget 300 is aligned with the octagonal plate 26 of the main shaft 20, and the primary pin 42 of the locking member 40 is in the disengagement position hole. After the octagonal mounting hole 12 is placed over the octagonal plate 26 of the main shaft 20, rotate the mounting gadget 300 to a desired orientation. At this instance, the mounting gadget 300 is rotated clockwise to lock to a vertical position, which is shown in FIG. 12. The teeth of the clutch 30 are engaging with the teeth engagement wall of the mounting gadget 300 when the octagonal hole 12 of the mounting gadget 300 is placed over the octagonal plate 26 of the main shaft 20. The rotational force from the mounting gadget 300 will be translated to the locking member 40 through the clutch 30. During transition to the engagement position, the primary pin 49 of the locking member 40 is out of the disengagement position hole transiting to the primary pin engagement hole 21.

During engagement position, the primary pin 49 of the locking member 40 is in the primary pin engagement hole 21 of the main shaft 20, and the secondary pin 43 of the locking member 40 is in the secondary pin engagement hole 51 on the covering cap 50.

Figure 11:
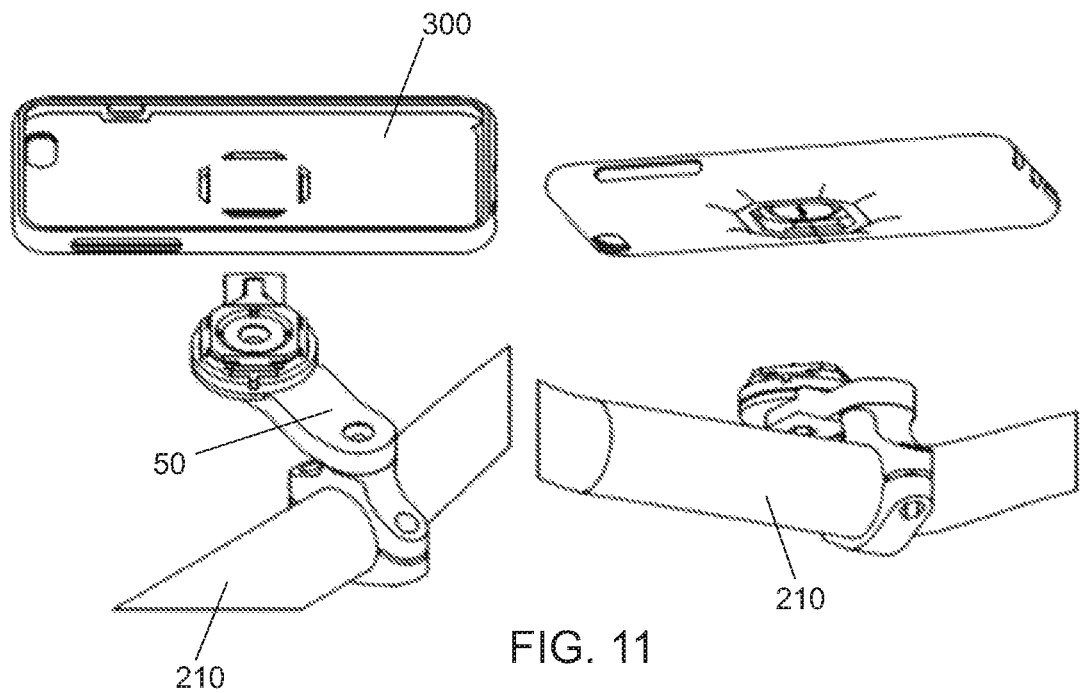
FIG. 11 is a schematic view showing how a handphone be locked onto the locking system in accordance with the present invention.

To quick release of the mounted gadget 300 from the locking system 100, the squeeze release surface 48 on the locking member 40 is squeezed. When a force is applied to the squeeze release surface 48, the secondary pin 43 of the locking member 40 will slide out of the secondary pin engagement hole 51. When a force is applied to the squeeze release surface 48, the primary pin 49 of the locking member 40 will slide out of the primary pin engagement hole 21 of the main shaft 20. While holding the locking member 40 in the unlocking position, rotate the mounting gadget 300 and lift the mounted gadget 300 away from the locking system 100, as shown in FIG. 11.

In accordance with the present invention, the locking system with a quick-release mechanism 100 can be used in many instances. For instance, the locking system 100 is used in mounting a mug in place, as shown in FIG. 12, and any type of appropriate size gadget, as seen in FIG. 13, a mug 400, and a flashing beacon 401, as shown in FIG. 14, and a camera 402, as shown in FIG. 15.

Figure 13:
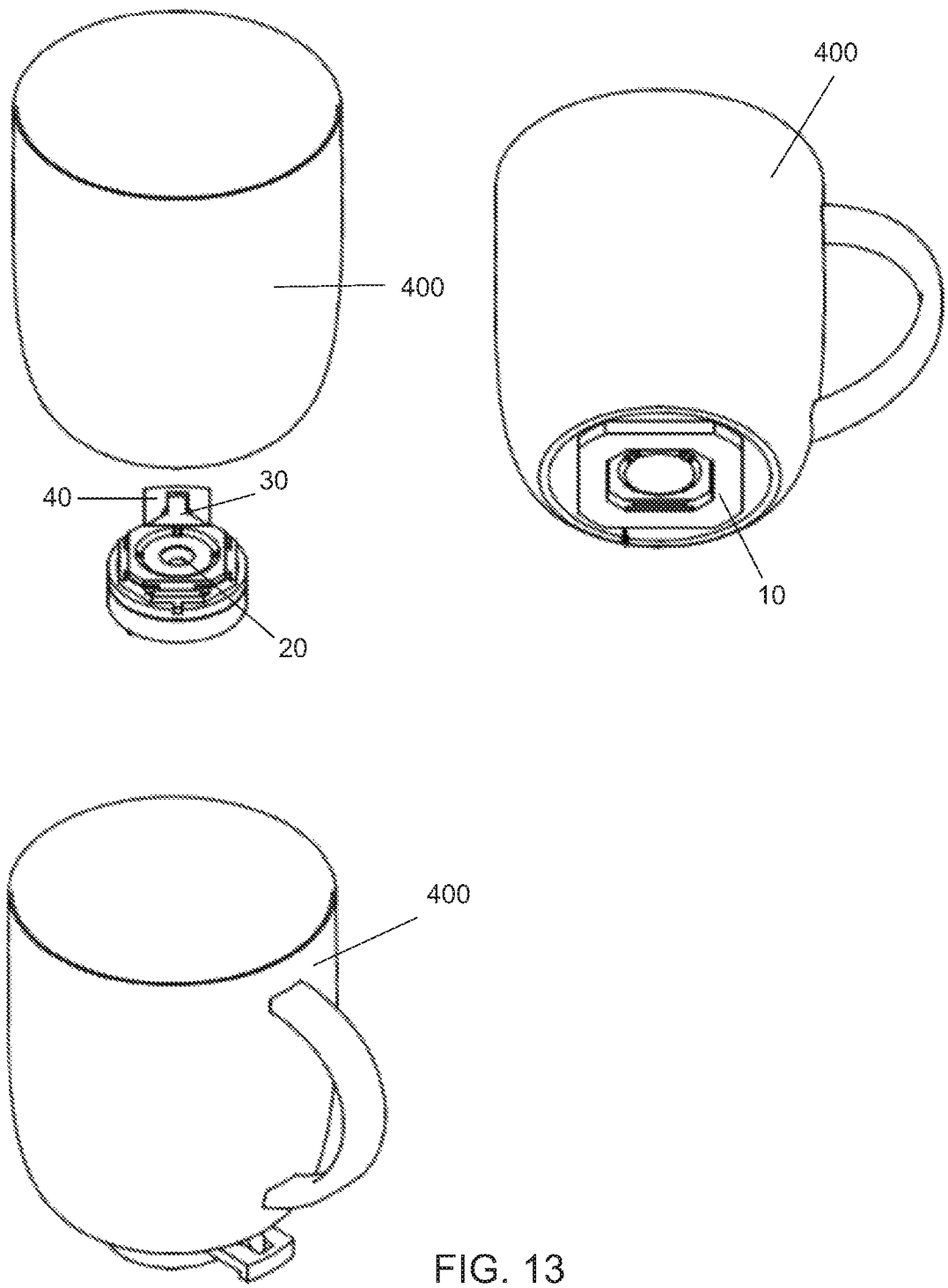
FIGS. 13-15 are perspective views showing the mounting plate being mounted onto the bottom of a gadget of another preferred embodiment of the present invention.
Figure 14:
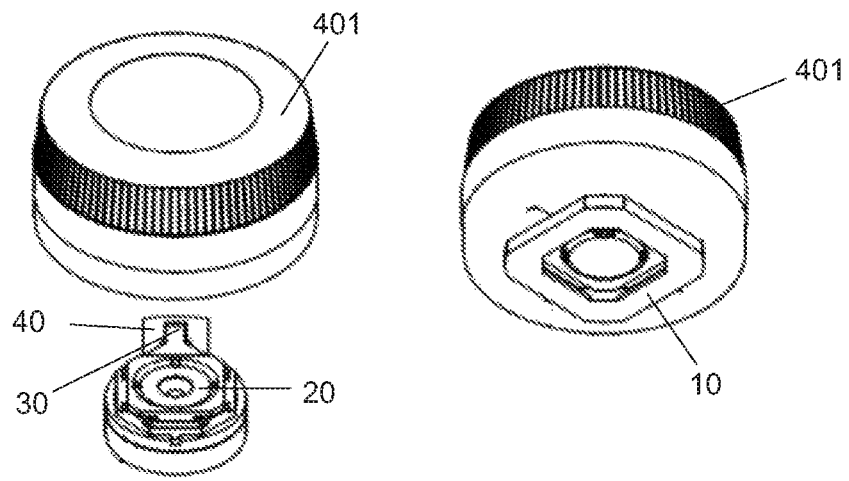
Figure 14:
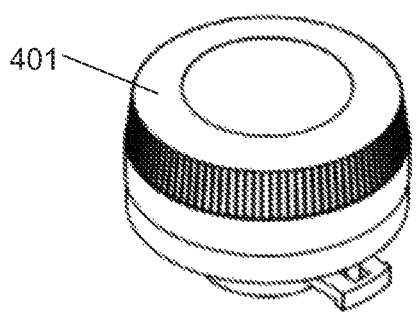
Figure 15:
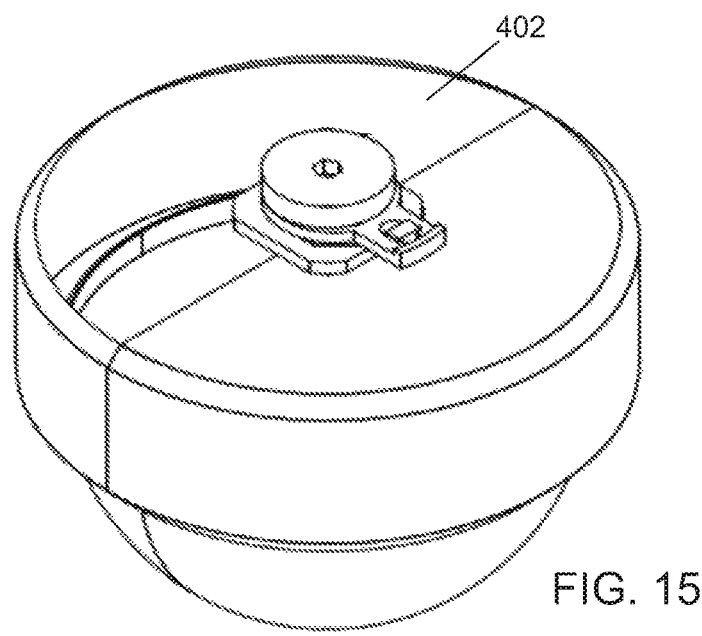

FIGS. 13, 14 and 15 are perspective views showing how the mounting plate 10 can be fitted onto the bottom face of some gadgets that to be mounted. As shown in FIG. 13, the mounting plate 10 is mounted to any flat surface of a mug 400, and the main shaft 20 together with the locking member 40, the clutch 30 and the covering cap 50 is mounted to a support for instance, dashboard of a vehicle, boat, etc. In this preferred embodiment, the mug 400 is used, and the mug 400 is securely mounted onto the dashboard of a boat.

Other ways of mounting the locking system, for example, include mounting on a tripod such that the users can switch devices at any instant. The locking system 100 in accordance with the present invention is also applicable in the aerospace, space program, rigging platforms as a result of the mounts versatility and compact design of the locking system.

Any of the embodiments described herein may be modified to include any of the structures or methodologies disclosed in connection with other embodiments. Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same.

The invention claimed is:

1. A locking system with a quick-release mechanism for mounting an article or the like, the system comprising:
    (a) a mounting plate adapted for attachment to the article or the like, wherein the mounting plate includes a central cavity having a plurality of locking grooves and conical surface along the circumferential edge of the central cavity;
    (b) a main shaft having one surface with a shape adapted for mounting onto the mounting plate and having a plurality of locking projections formed circumferentially on a circular groove provided on the surface of the main shaft, and one the other surface of the main shaft being formed into a plurality of disengagement position hole, a plurality of sliding projections, and primary pin engagement hole and a circular wall surface for the contact movement with a circular wall surface of a clutch surface of the edge of pin is circular and clutch;
    (c) the clutch having a narrow tip protruded outwardly, and a circular cavity with a protruded circular wall with two oppositely arranged clamping elements, wherein a groove is formed between the two clamping elements on the circular wall, and a sliding projection is formed at a notch formed on the circular wall, and wherein a sliding surface is formed at the narrow tip of the clutch being extended outwardly, wherein at least two clamping grooves are formed between the at least two clamping elements;
    (d) a locking member having a generally circular cavity with a sliding groove for the engagement with the sliding projection of the main shaft, and a primary pin and a secondary pin formed along the circumferential edge of the cavity, and two hooks extending outwardly from the circumferential edge of the cavity, having a sliding slot and a squeezing releasing surface; and
    (e) a covering cap having a generally circular structure having a plurality rounded circular ridges with a series of indention for said secondary pin, wherein the center of the covering cap is for fastening the main shaft, the clutch the locking member and the coving cap as a combined unit,
    wherein the mounting plate is attached to the object or the gadget, and the main shaft is then locked onto the mounting plate, the clutch is coupled to the mounting plate, the main shaft is mounted with the covering cap and the main shaft is twisted to lock the object to the mounting plate by rotating the object or the like to an angle of 45, the object is released from being mounted.

2. The locking system with a quick-release mechanism as set forth in claim 1, wherein the hooks of the locking member enter and stay in the clamping groove on the clutch.

3. The locking system with a quick-release mechanism as set forth in claim 1, wherein the sliding surface formed on the clutch is used to engage the sliding projections of the main shaft.

4. The locking system with a quick-release mechanism as set forth in claim 1, wherein the sliding slot provided on the locking member is for the mounting with the sliding surface of the clutch.

5. The locking system with a quick-release mechanism as set forth in claim 1, wherein the covering cap is cooperating with the clutch and the locking member in performing a mounting movement.

6. The locking system with a quick-release mechanism as set forth in claim 1, wherein the mounting plate includes a plurality of locking grooves and a self-alignment conical surface to be mounted with a locking wall on an article to be mounted.

7. The locking system with a quick-release mechanism as set forth in claim 6, wherein the mounting plate is to be mounted to a casing for the article for locking with the main shaft of the locking system.

8. The locking system with a quick-release mechanism as set forth in claim 1, wherein a spring is inserted into a spring groove provided on the locking member such that the spring sits on the spring groove.

9. The locking system with a quick-release mechanism as set forth in claim 1, wherein the mounting plate is octagonal which can be easily matched and aligned with the shape of the main shaft.

10. The locking system with a quick-release mechanism as set forth in claim 1, wherein the position of the squeezable releasing surface is set at a desired position for releasing of a locked article.

11. The locking system with a quick-release mechanism as set forth in claim 1, wherein the clutch is acted on by a spring positioned at the spring groove on the clutch.

* * * * *